(12) United States Patent
Hassler (10) Patent No.: US 12,184,906 B2
(45) Date of Patent: Dec. 31, 2024

(54) METHOD AND SYSTEM FOR DETECTING AND MANAGING SIMILAR CONTENT

(71) Applicant: Comcast Cable Communications, LLC, Philadelphia, PA (US)

(72) Inventor: Garey Hassler, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 186 days.

(21) Appl. No.: 17/247,934

(22) Filed: Dec. 30, 2020

(65) Prior Publication Data

US 2022/0210488 A1 Jun. 30, 2022

(51) Int. Cl.
*H04N 21/231* (2011.01)
*H04N 21/234* (2011.01)
*H04N 21/25* (2011.01)

(52) U.S. Cl.
CPC . *H04N 21/23106* (2013.01); *H04N 21/23418* (2013.01); *H04N 21/251* (2013.01)

(58) Field of Classification Search
CPC ....... H04N 21/23106; H04N 21/23418; H04N 21/251
See application file for complete search history.

(56) References Cited

U.S. PATENT DOCUMENTS

| | | | |
|---|---|---|---|
| 7,770,198 B1* | 8/2010 | Greene | H04N 21/23106 725/93 |
| 2005/0066352 A1* | 3/2005 | Herley | H04N 21/44008 725/19 |
| 2005/0193414 A1* | 9/2005 | Horvitz | H04N 7/163 725/89 |
| 2007/0124756 A1* | 5/2007 | Covell | H04N 21/8106 725/18 |
| 2010/0094931 A1* | 4/2010 | Hosur | H04N 21/25808 709/203 |
| 2011/0126236 A1* | 5/2011 | Arrasvuori | H04N 21/4532 725/46 |
| 2015/0215816 A1* | 7/2015 | Abou-Elkheir | H04L 67/2847 370/230 |
| 2015/0334204 A1* | 11/2015 | Bilinski | H04N 21/25891 715/748 |
| 2018/0338168 A1* | 11/2018 | Du Breuil | H04L 65/601 |
| 2021/0021905 A1* | 1/2021 | Li | H04N 21/44 |

* cited by examiner

*Primary Examiner* — Michael R Telan
(74) *Attorney, Agent, or Firm* — BakerHostetler (57) ABSTRACT

Systems and methods are described herein for dynamically detecting repetitive content. The content that is detected as repetitive may be cached for longer periods of time. Subsequent re-transmissions of the repetitive content to user devices may be done by retrieving the content from a cache rather than requesting the content from a transcoder and/or a packager. The repetitive content segments may be retrieved from a cache, thereby saving transcoding and other system resources. A data file may be generated to map the stored segments to their cache locations and to indicate a predicted time for future transmission of the content.

20 Claims, 7 Drawing Sheets

METHOD AND SYSTEM FOR DETECTING AND MANAGING SIMILAR CONTENT

BACKGROUND

Content providers typically provide content that is replayed or otherwise repeated at a later time. For example, some content may be required to be presented multiple times, such as public/education/government (PEG) type content. Repetitive content may comprise content ranging from a few minutes to one or more hours that is run over and over again. Repetitive content may transverse a large portion of a network and may need to be transcoded and/or packaged each time. Accordingly, there is a need for improved techniques for handling similar or repetitive content.

SUMMARY

Systems and methods are described herein for dynamically monitoring content for similar or repetitive content, and detecting similar or repetitive content, such as duplicative content. Characteristics of such content, such as duration of the content and time since last transmission of such content, are monitored and dynamically analyzed. The techniques described herein reduce re-transcoding of the repetitive content and may determine transitions from the repetitive content to new content. The content that is detected as repetitive may be cached for longer periods of time and subsequent re-transmissions of such content may be done by retrieving content from a cache rather than requesting them from a transcoder and/or a packager. Repetitive content may be detected by using, for example, video analysis, which may be based on machine learning algorithms that are trained to analyze video to detect repetitive content and to determine how long to store/cache repetitive content based on predicted or anticipated future use. The repetitive content segments may be retrieved by the packager from the cache, rather than being requested again from a transcoder. The system may generate a manifest file that maps the stored segments to their cache locations and indicates a cycle for the repetition of the cached content. Such a manifest may be used by a packager, or a similar device, for retrieving content.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Systems and methods are described herein for processing content. The systems and methods described herein may dynamically detect the repetition of content and determine how long to store/cache repetitive content based on predicted or anticipated future use. The techniques described herein may prevent re-transcoding of the repetitive content and may determine transitions from the repetitive content to new content. Repetitive content may comprise any content that is similar to other content, any content that is redundant to other content, and/or any content that is duplicative of other content.

Content that is detected as repetitive may be cached for longer periods of time in anticipation of repeated use. As a result, subsequent re-transmissions of the repetitive content to content rendering devices may be done by retrieving content from a cache rather than re-transcoding. Content such as PEG programming frequently repeats itself and therefore may be cached for longer periods of time during a playback cycle rather than being re-transcoded whenever it is repeated.

Repetitive content may be detected by using, for example, video analysis. The video analysis may comprise one or more of pixel by pixel analysis, sample areas analysis, predictive analysis. The video analysis may be based on machine learning algorithms that are trained analyze video and predict repetitive content. The video analysis may indicate that frames are repetitive as compared to previously received frames.

Once repetitive content has been detected, the duration of the repetitive content, how much time has passed since a last transmission of the content, and other parameters are determined. These parameters may be used to determine how long to cache the repetitive content in anticipation of future use of the content. For example, cache duration settings may be changed to store the repetitive content for longer periods of time than it normally would have been stored. When the content is scheduled to be re-transmitted again, the segments are retrieved by the packager from the cache, rather than being requested again from a transcoder. When the cache settings are changed to store repetitive content for longer periods, the packager may generate a manifest file that maps the stored segments to their cache locations and indicates a cycle for the repetition of the cached content.

Figure 1:
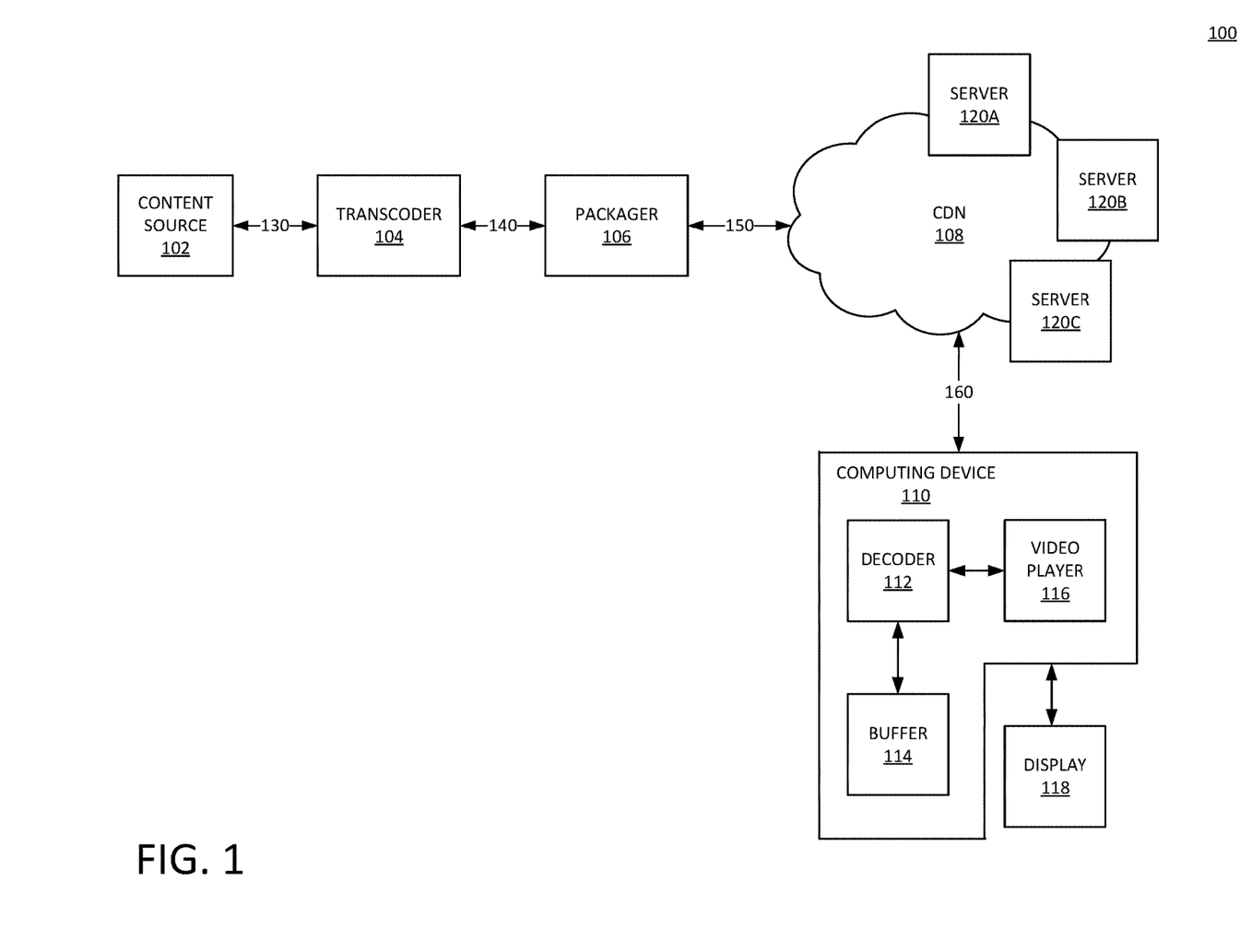
FIG. 1 shows an example system.

FIG. 1 shows system 100. The system 100 may comprise a content source 102, transcoder 104, packager 106, a content delivery network (CDN) 108, and a computing device 110. The techniques for video processing described herein are applicable to any delivery method including but not limited to Dynamic Adaptive Streaming over Hypertext Transfer Protocol (HTTP) (DASH), HTTP Live Streaming (HLS), the QAM digital television standard, and adaptive bitrate (ABR) streaming.

The computing device 110 may comprise a television, a monitor, a laptop, a desktop, a smart phone, a set-top box, a cable modem, a gateway, a tablet, a wearable computing device, a mobile computing device, any computing device configured to receive and/or render content, the like, and/or any combination of the foregoing. The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The decoder 112 may decompress/decode encoded video data. The encoded video data may be received from the transcoder 104, the packager 106, or the CDN 108.

The content source 102 may comprise a source feed of content from a provider. For example, the content source 102 may comprise a broadcast source, a headend, a video on-demand server, a cable modem termination system, the like, and/or any combination of the foregoing. The content source 102 may send content 130 to the transcoder 104. The content 130 may comprise video frames or other images. For example, the content 130 may comprise video frames in a Moving Picture Experts Group (MPEG) Single Program Transport Stream (MPEG-SPTS). Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The content source 102 may receive requests for the content 130 from the transcoder 104, the packager 106, the computing device 110, or the CDN 108.

The content source 102 may send content 130 to the transcoder 104 based on a request for video from the transcoder 104, the packager 106, the computing device 110, or the CDN 108. The content 130 may comprise uncompressed video data or a content stream such as an MPEG-SPTS. The transcoder 104 may transcode the content 130 into one or more output streams 140. The one or more output streams 140 may comprise video encoded with a different resolution and/or a different bitrate. The one or more output streams 140 may comprise a presentation timestamp (PTS) to synchronize the content. The one or more output streams 140 may comprise one or more Instantaneous Decoder Refresh (IDR) frames.

The transcoder 104 may comprise an encoder, which may encode uncompressed video data received from the content source 102. When uncompressed video data is received, the encoder may encode the video (e.g., into a compressed format) using a compression technique prior to transmission. The content source 102 and the transcoder 104 may be co-located at a premises, located at separate premises, or associated with separate instances in the cloud.

The packager 106 may receive the one or more output streams 140 from the transcoder 104. The packager 106 may generate one or more ABR streams 150 in different ABR streaming formats. The one or more ABR streams 150 may comprise segments or fragments of video and a manifest. The manifest may indicate availability of the ABR stream and segments/fragments and information for requesting the segments/fragments (e.g., via a Uniform Resource Locator (URL)). The packager 106 may send the one or more ABR streams 150 to the CDN 108.

The CDN 108 may comprise one or more computing devices such as servers 120A, 120B, 120C that store the one or more ABR streams 150. The CDN 108 may receive a request for content from the computing device 110. The request may be sent via HTTP. The CDN 108 may authorize/authenticate the request and/or the computing device 110 from which the request originated. The request for content may comprise a request for a channel, a video on-demand asset, a website address, a video asset associated with a streaming service, the like, and/or any combination of the foregoing. The CDN 108 may send the request to the content source 102, the transcoder 104, or the packager 106. The CDN 108 may send the requested content 160 to the computing device 110. The one or more servers 120A, 120B, 120C of the CDN 108 may serve the content 160 to the computing device 110.

In accordance with the embodiments described herein, devices in a system for transcoding and packaging content for rendering by playback devices may detect repetition of content. A transcoder may receive a source feed from a provider and detect repetitive content in the source feed and may send information to the packager indicating that the content includes repetitive content. A packager may receive the output of a transcoder and detect repetitive content in the transcoder output. A separate computing device may receive the output of a transcoder, may detect repetitive content in the transcoder output, and may send information to the packager indicating that the content includes repetitive content.

Detection of repetitive content may be achieved by comparison of incoming content frames with frames stored in a buffer. The comparison may be performed based on one or more machine learning techniques. For example, a machine learning image detection algorithm may collect the frames in an internal buffer, compare the incoming frames with the previously received frames in the internal buffer with the objective of detecting repetition. The comparison may comprise video analysis such as pixel by pixel analysis, sample areas analysis, predictive analysis, etc.

Once repetition is detected, prediction of subsequent frames may be initiated for corroboration of matching. If this predictive operation of one or more subsequent frames is successful, it can accurately specify the duration of the repetitive video using the source timeline. For example, the system may determine the duration of the repetitive video based on information such as presentation timestamp in the source feed. The system may compare the presentation timestamp of a repetitive frame to a previously processed frame to determine a total repetition duration of the content. The system may use the total duration of repetition to determine the total amount of content that is repetitive.

The system may determine information such as statistics indicating how much time has passed since a last transmission of the repetitive content, how often the content provider switches to new content and returns to the repetitive content, and other such parameters. This information may be used to determine how long to increase the cache duration of the repetitive content in anticipation of future use of the content. For example, the system may determine an optimal increased cache value based upon these statistics. The information may indicate when the return to repetitive content is likely to occur and may be used to increase the cache value so that the repetitive content is available in the cache for the predicted future use.

Once the repetition has been detected, the duration of the repetition has been determined, the total amount of repetitive content is determined, and the predicted future playback time of the repetitive content has been determined, this information can be used by a packager to process the content in a mode referred to herein as a low processing mode. In low processing mode, the packager or other device may cache the repetitive content for an increased amount of time based on the predicted future playback time of the repetitive content. Because the repetitive content is available in a cache when it is repeated, the system does not need to request it from a content provider and transcode it again.

The packager in low processing mode may expand the cache control duration of segments of the repetitive content. For example, the packager may expand the cache control duration of segments of the repetitive content from the active linear setting of 60 seconds to a higher level. The higher level may be a number of hours (e.g., 24 hours), days, or even months. The packager may process the segments through the next cycle of the content and may stop processing the input from the transcoder once the next cycle completes until receiving information indicating that there is new video in the input from the transcoder. The packager may update the manifest that it generates to indicate that there is repetitive content. For example, the updated manifest may instruct a playback computing device to cycle through the content repetitively, updating the timeline appropriately.

For example, the cycle may indicate a number of repetitive segments of content. The manifest may indicate the length of the cycle so that the playback device can determine when to repeat a request for a repetitive segment. For example, if the cycle is three segments long, the playback device may request segment one again after playing back segment three. All three segments would be available in a cache in anticipation of the repetitive segments (e.g., segments one, two, and three) being requested again. As aforementioned, the duration of time for caching the repetitive segments would be based on information determined by the system. The information would indicate a prediction of the future use. For example, the future use may indicate that the content is to be cached for repeated use for 24 hours.

These techniques may result in data traffic reduction because the only content traveling between the packager and any playback computing devices through the CDN is the manifest from the packager to the playback computing devices and the content stored in the CDN to the playback computing devices. Further, the repetitive content may be stored non-volatile storage rather than more expensive volatile memory.

This predictive processing may continue to operate to detect any deviation from the repetitive video and the commencement of new video content. Upon this detection, new information may be sent to the packager instructing the packager to exit low processing mode, to resume processing of the input feed, and to splice in the new segments at the most recent point in the manifest as the next segment. Previous content may be continuously compared to the new video content for possible repetition. If repetition is detected again, it may notify the packager to go into low processing mode again. The packager may transition between full and low processing modes as frequently as necessary, with a preference to those streams that do not have a high frequency of transitions during a normal day.

Figure 2:
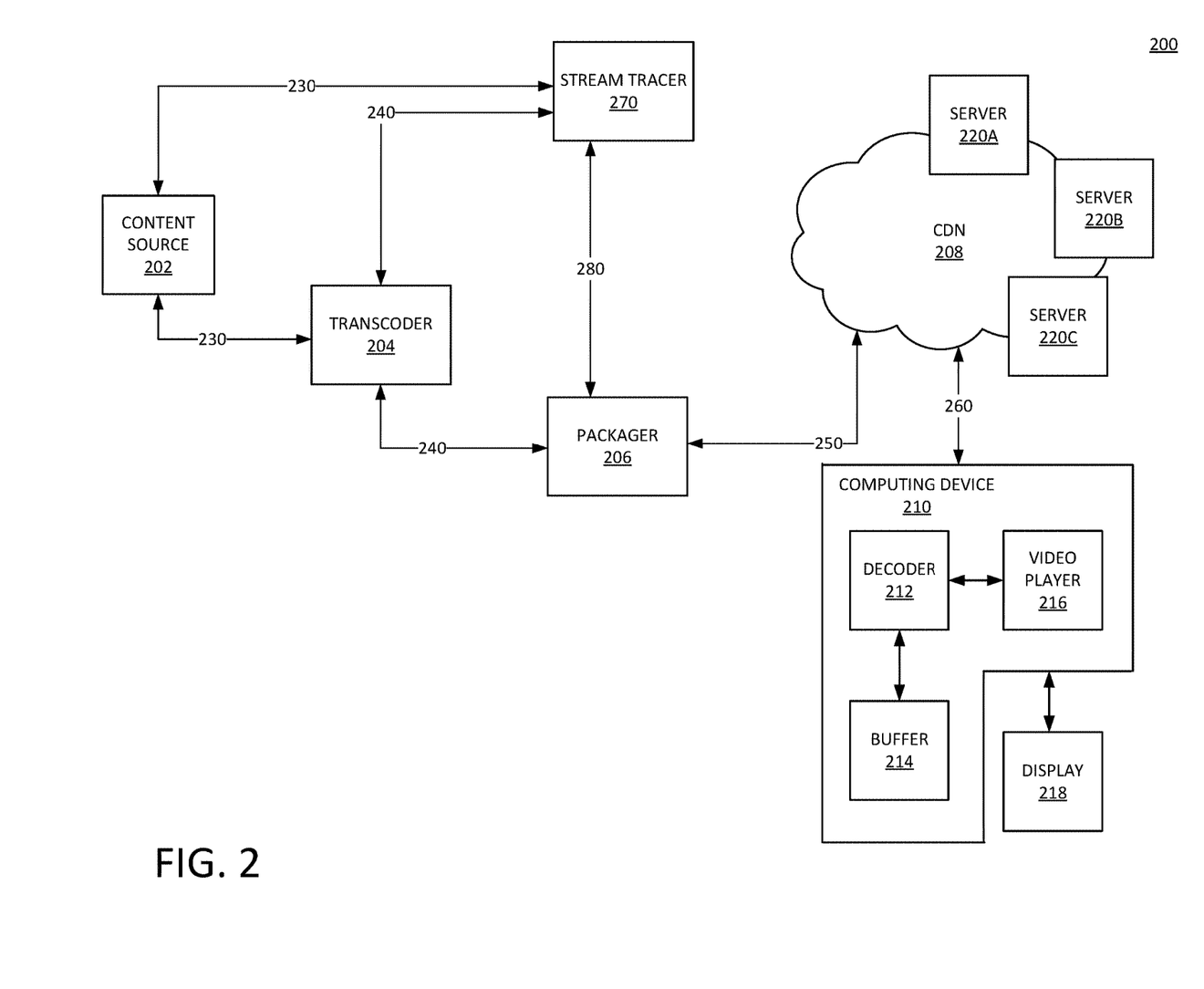
FIG. 2 shows an example system.

FIG. 2 shows an example system 200. The system 200 may comprise a content source 202, transcoder 204, packager 206, a CDN 208, and a computing device 210. The system 200 may be configured to detect repetitive content and prevent its re-transcoding when the content is being repeated by the content source 202.

The computing device 210 may comprise a television, a monitor, a laptop, a desktop, a smart phone, a set-top box, a cable modem, a gateway, a tablet, a wearable computing device, a mobile computing device, any computing device configured to receive and/or render content, the like, and/or any combination of the foregoing. The computing device 210 may comprise a decoder 212, a buffer 214, and a video player 216. The computing device 210 (e.g., the video player 216) may be communicatively connected to a display 218. The display 218 may be a separate and discrete component from the computing device 210, such as a television display connected to a set-top box. The display 218 may be integrated with the computing device 210. The decoder 212, the video player 216, the buffer 214, and the display 218 may be realized in a single device, such as a laptop or mobile device. The decoder 212 may decompress/decode encoded video data. The encoded video data may be received from the transcoder 204, the packager 206, or the CDN 208.

The content source 202 may comprise a source feed of content from a provider. For example, the content source 202 may comprise a broadcast source, a headend, a video on-demand server, a cable modem termination system, the like, and/or any combination of the foregoing. The content source 202 may send content 230 to the transcoder 204. The content 230 may comprise video frames or other images. For example, the content 230 may comprise video frames in an MPEG-SPTS. The content source 202 may receive requests for the content 230 from the transcoder 204, the packager 206, the computing device 210, or the CDN 208.

The content source 202 may send content 230 to the transcoder 204 based on a request for video from the transcoder 204, the packager 206, the computing device 210, or the CDN 208. The content 230 may comprise uncompressed video data or a content stream such as an MPEG-SPTS. The transcoder 204 may transcode the content 230 into one or more output streams 240. The one or more output streams 240 may comprise video encoded with a different resolution and/or a different bitrate. The one or more output streams 240 may comprise a PTS to synchronize the content. The one or more output streams 240 may comprise one or more IDR frames.

The transcoder 204 may comprise an encoder, which may encode uncompressed video data received from the content source 202. When uncompressed video data is received, the encoder may encode the video (e.g., into a compressed format) using a compression technique prior to transmission. The content source 202 and the transcoder 204 may be co-located at a premises, located at separate premises, or associated with separate instances in the cloud.

The packager 206 may receive the one or more output streams 240 from the transcoder 204. The packager 206 may generate one or more ABR streams 250 in different ABR streaming formats. The one or more ABR streams 250 may comprise segments or fragments of video and a manifest. The manifest may indicate availability of the ABR stream and segments/fragments and information for requesting the segments/fragments (e.g., via a URL). The packager 206 may send the one or more ABR streams 250 to the CDN 208.

The CDN 208 may comprise one or more computing devices such as servers 220A, 220B, 220C that store the one or more ABR streams 250. The CDN 208 may receive a request for content from the computing device 210. The request may be sent via HTTP. The CDN 208 may authorize/authenticate the request and/or the computing device 210 from which the request originated. The request for content may comprise a request for a channel, a video on-demand asset, a website address, a video asset associated with a streaming service, the like, and/or any combination of the foregoing. The CDN 208 may send the request to the content source 202, the transcoder 204, or the packager 206. The CDN 208 may send the requested content 260 to the computing device 210. The one or more servers 220A, 220B, 220C of the CDN 208 may serve the content 260 to the computing device 210.

The system 200 may comprise a computing device configured to detect the repetition of content in the one or more output streams 240 or in the content 230 from the content source 202. The computing device, configured to detect the repetition of content in the one or more output streams 240 or in the content 230 from the content source 202, may be referred to herein as a stream tracer 270, which may be implemented by software running on one or more computing devices. The stream tracer 270 may detect repetitive content in the one or more output streams 240 or in the content 230 from the content source 202. The stream tracer 270 may compare incoming content frames, such as reference frames, in the one or more output streams 240 or in the content 230 from the content source 202 with frames stored in an internal buffer. The stream tracer 270 may detect the repetition of content based on the comparison.

The stream tracer 270 may be configured to perform one or more machine learning algorithms based on one or more trained machine learning models. The one or more machine learning algorithms may perform video analysis such as pixel by pixel analysis, sample areas analysis, predictive analysis, etc.). Once a probability of repetition is detected, the one or more machine learning algorithms may predict subsequent frames for corroboration of the detected repetition. Once the one or more machine learning algorithms generate a successful prediction of the subsequent frames, the stream tracer 270 may determine the duration of the repetitive content using the source timeline. The stream tracer 270 may determine information such as statistics indicating how much time has passed since a last transmission of the repetitive content, how often the content source 202 switches to new content and returns to the repetitive content, and other such parameters. This information may be used to determine how long to increase the cache duration of the repetitive content in anticipation of future playback of the content. For example, the stream tracer 270 may determine an optimal increased cache value based upon these statistics. The information may indicate when the return to repetitive content is likely to occur and may be used to increase the cache value so that the repetitive content is available in the cache for the predicted future use.

When the stream tracer 270 receives the content 230 (e.g., uncompressed video data or compressed video data) from the content source 202, less pre-processing is performed by the one or more machine learning models when detecting repetition.

The stream tracer 270 may send information 280 to the packager 206 to process the content in a mode referred to herein as a low processing mode. The information 280 provided to the packager 206 may comprise statistics for an optimal increased cache value per stream. For example, the an optimal increased cache value may comprise an increased cache value over time based upon the content provider switching to new content and returning to repetitive content at a future playback time.

The packager 206 may receive the information 280. The packager 206 may, based on the received information 280, change cache duration settings for the repetitive content so that is available in the cache for a predicted future playback time. For example, the packager 206 may expand the cache control duration of segments of the repetitive content from the active linear setting of 60 seconds to a higher level. The higher level may be a number of hours (e.g., 24 hours), a number of days, or even a number of months. The packager 206 may process the repetitive content in the one or more output streams 240 through the next cycle of the content. The packager 206 may stop processing the one or more output streams 240 from the transcoder 204 once the next cycle completes until receiving information indicating that there is new video in the one or more output streams 240 from the transcoder 204. The packager 206 may update the manifest that it generates to indicate that there is repetitive content. For example, the updated manifest may instruct the computing device 110 to cycle through the content repetitively, updating the timeline appropriately.

For example, the cycle may indicate a number of repetitive segments of content. The manifest may indicate the length of the cycle so that the playback device can determine when to repeat a request for a repetitive segment. For example, if the cycle is three segments long, the playback device may request segment one again after playing back segment three. All three segments would be available in a cache in anticipation of the repetitive segments (e.g., segments one, two, and three) being requested again.

The stream tracer 270 may continue predictive processing to detect any deviation from the repetitive video in the one or more output streams 240 from the transcoder 204 and the commencement of new content. Upon detection new content, the information 280 may be updated and sent to the packager 206 instructing the packager 206 to exit low processing mode, to resume processing of the one or more output streams 240 from the transcoder 204, and to splice in the new segments at the most recent point in the manifest as the next segment.

The stream tracer 270 may continuously compare previous content to the new content for possible repetition. If repetition is detected again, it may notify the packager 206 to re-enter low processing mode. The packager 206 may transition between full and low processing modes as frequently as necessary, with a preference to those streams in the one or more output streams 240 that do not have a high frequency of transitions during a normal day.

Figure 3:
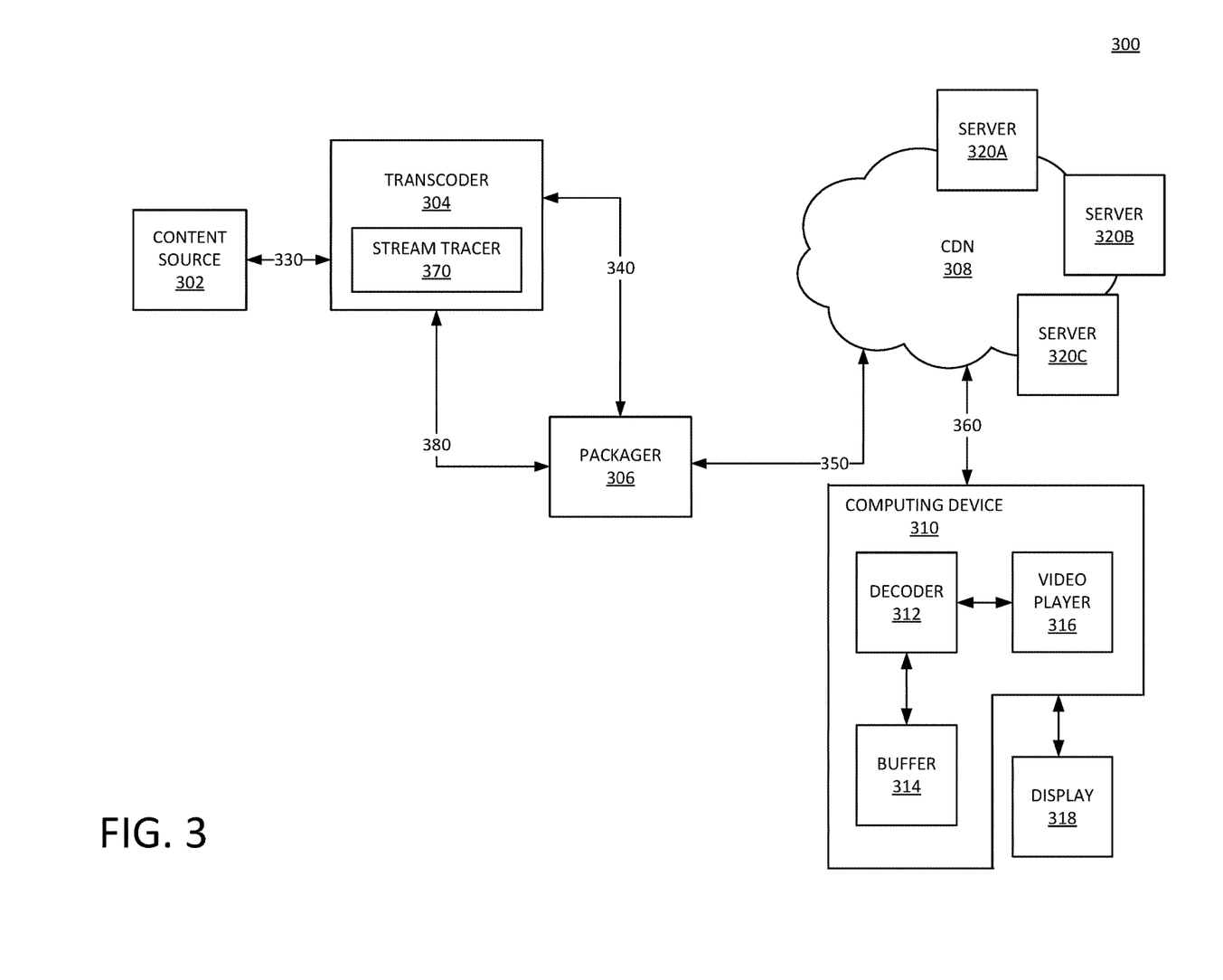
FIG. 3 shows an example system.

FIG. 3 shows an example system 300. The system 300 may comprise a content source 302, transcoder 304, packager 306, a CDN 308, and a computing device 310. The system 300 may be configured to detect repetitive content and prevent its re-transcoding when the content is being repeated by the content source 302.

The computing device 310 may comprise a television, a monitor, a laptop, a desktop, a smart phone, a set-top box, a cable modem, a gateway, a tablet, a wearable computing device, a mobile computing device, any computing device configured to receive and/or render content, the like, and/or any combination of the foregoing. The computing device 310 may comprise a decoder 312, a buffer 314, and a video player 316. The computing device 310 (e.g., the video player 316) may be communicatively connected to a display 318. The display 318 may be a separate and discrete component from the computing device 310, such as a television display connected to a set-top box. The display 318 may be integrated with the computing device 310. The decoder 312, the video player 316, the buffer 314, and the display 318 may be realized in a single device, such as a laptop or mobile device. The decoder 312 may decompress/decode encoded video data. The encoded video data may be received from the transcoder 304, the packager 306, or the CDN 308.

The content source 302 may comprise a source feed of content from a provider. For example, the content source 302 may comprise a broadcast source, a headend, a video on-demand server, a cable modem termination system, the like, and/or any combination of the foregoing. The content source 302 may send content 330 to the transcoder 304. The content 330 may comprise video frames or other images. For example, the content 330 may comprise video frames in an MPEG-SPTS. The content source 302 may receive requests for the content 330 from the transcoder 304, the packager 306, the computing device 310, or the CDN 308.

The content source 302 may send content 330 to the transcoder 304 based on a request for video from the transcoder 304, the packager 306, the computing device 310, or the CDN 308. The content 330 may comprise uncompressed video data or a content stream such as an MPEG-SPTS. The transcoder 304 may transcode the content 330 into one or more output streams 340. The one or more output streams 340 may comprise video encoded with a different resolution and/or a different bitrate. The one or more output streams 340 may comprise a PTS to synchronize the content. The one or more output streams 340 may comprise one or more IDR frames.

The transcoder 304 may comprise an encoder, which may encode uncompressed video data received from the content source 302. When uncompressed video data is received, the encoder may encode the video (e.g., into a compressed format) using a compression technique prior to transmission. The content source 302 and the transcoder 304 may be co-located at a premises, located at separate premises, or associated with separate instances in the cloud.

The packager 306 may receive the one or more output streams 340 from the transcoder 304. The packager 306 may generate one or more ABR streams 350 in different ABR streaming formats. The one or more ABR streams 350 may comprise segments or fragments of video and a manifest. The manifest may indicate availability of the ABR stream and segments/fragments and information for requesting the segments/fragments (e.g., via a URL). The packager 306 may send the one or more ABR streams 350 to the CDN 308.

The CDN 308 may comprise one or more computing devices such as servers 320A, 320B, 320C that store the one or more ABR streams 350. The CDN 308 may receive a request for content from the computing device 310. The request may be sent via HTTP. The CDN 308 may authorize/authenticate the request and/or the computing device 310 from which the request originated. The request for content may comprise a request for a channel, a video on-demand asset, a website address, a video asset associated with a streaming service, the like, and/or any combination of the foregoing. The CDN 308 may send the request to the content source 302, the transcoder 304, or the packager 306. The CDN 308 may send the requested content 360 to the computing device 310. The one or more servers 320A, 320B, 320C of the CDN 308 may serve the content 360 to the computing device 310.

The transcoder 304 may be configured to detect the repetition of content in the content 330 received from the content source 302. The transcoder 304 may comprise a component, that is configured to detect the repetition of content the content 330 received from the content source 302, which may be referred to herein as a stream tracer 370. The stream tracer 370 may detect repetitive content the content 330 received from the content source 302. The stream tracer 370 may compare incoming content frames in the content 330 received from the content source 302 with frames stored in an internal buffer. The stream tracer 370 may detect the repetition of content based on the comparison. The stream tracer 370 may be configured to perform one or more machine learning algorithms based on one or more trained machine learning models. The one or more machine learning algorithms may perform video analysis such as pixel by pixel analysis, sample areas analysis, predictive analysis, etc.). Once a probability of repetition is detected, the one or more machine learning algorithms may predict subsequent frames for corroboration of the detected repetition. Once the one or more machine learning algorithms generate a successful prediction of the subsequent frames, the stream tracer 370 may determine the duration of the repetitive content using the source timeline. The stream tracer 370 may determine information such as statistics indicating how much time has passed since a last transmission of the repetitive content, how often the content source 302 switches to new content and returns to the repetitive content, and other such parameters. This information may be used to determine how long to increase the cache duration of the repetitive content in anticipation of future playback of the content. For example, the stream tracer 370 may determine an optimal increased cache value based upon these statistics. The information may indicate when the return to repetitive content is likely to occur and may be used to increase the cache value so that the repetitive content is available in the cache for the predicted future use.

The transcoder 304 may send information 380 to the packager 306 to process the content in a mode referred to herein as a low processing mode. The information 380 provided to the packager 306 may comprise statistics an optimal increased cache value per stream. For example, the an optimal increased cache value may comprise an increased cache value over time based upon the content provider switching to new content and returning to repetitive content at a future playback time.

The information 380 may be sent in the encoder boundary point (EBP) group ID field in the one or more output streams 340 from the transcoder 304. The EBP group ID field may indicate transitions to the packager 306 to process the one or more output streams 340 from the transcoder 304. The EBP group ID field may indicate whether the content is assigned to existing content or to a new group ID. The EBP group ID field may indicate to the packager 306 which content to include in the manifest and which content is repetitive based upon the group id assigned to each EBP.

The packager 306 may receive the information 380. The packager 306 may, based on the received information 380, change cache duration settings for the repetitive content so that is available in the cache for a predicted future playback time. For example, the packager 306 may expand the cache control duration of segments of the repetitive content from the active linear setting of 60 seconds to a higher level. The higher level may be a number of hours (e.g., 24 hours), a number of days, or even a number of months. The packager 306 may process the repetitive content in the one or more output streams 340 through the next cycle of the content. The packager 306 may stop processing the one or more output streams 340 from the transcoder 304 once the next cycle completes until receiving information indicating that there is new video in the one or more output streams 340 from the transcoder 304. The packager 306 may update the manifest that it generates to indicate that there is repetitive content. For example, the updated manifest may instruct the computing device 110 to cycle through the content repetitively, updating the timeline appropriately.

For example, the cycle may indicate a number of repetitive segments of content. The manifest may indicate the length of the cycle so that the playback device can determine when to repeat a request for a repetitive segment. For example, if the cycle is three segments long, the playback device may request segment one again after playing back segment three. All three segments would be available in a cache in anticipation of the repetitive segments (e.g., segments one, two, and three) being requested again.

The stream tracer 370 may continue predictive processing to detect any deviation from the repetitive video in the one or more output streams 340 from the transcoder 304 and the commencement of new content. Upon detection new content, the information 380 may be updated and sent to the packager 306 instructing the packager 306 to exit low processing mode, to resume processing of the one or more output streams 340 from the transcoder 304, and to splice in the new segments at the most recent point in the manifest as the next segment.

The stream tracer 370 may continuously compare previous content to the new content for possible repetition. If repetition is detected again, it may notify the packager 306 to re-enter low processing mode. The packager 306 may transition between full and low processing modes as frequently as necessary, with a preference to those streams in the one or more output streams 340 that do not have a high frequency of transitions during a normal day.

Figure 4:
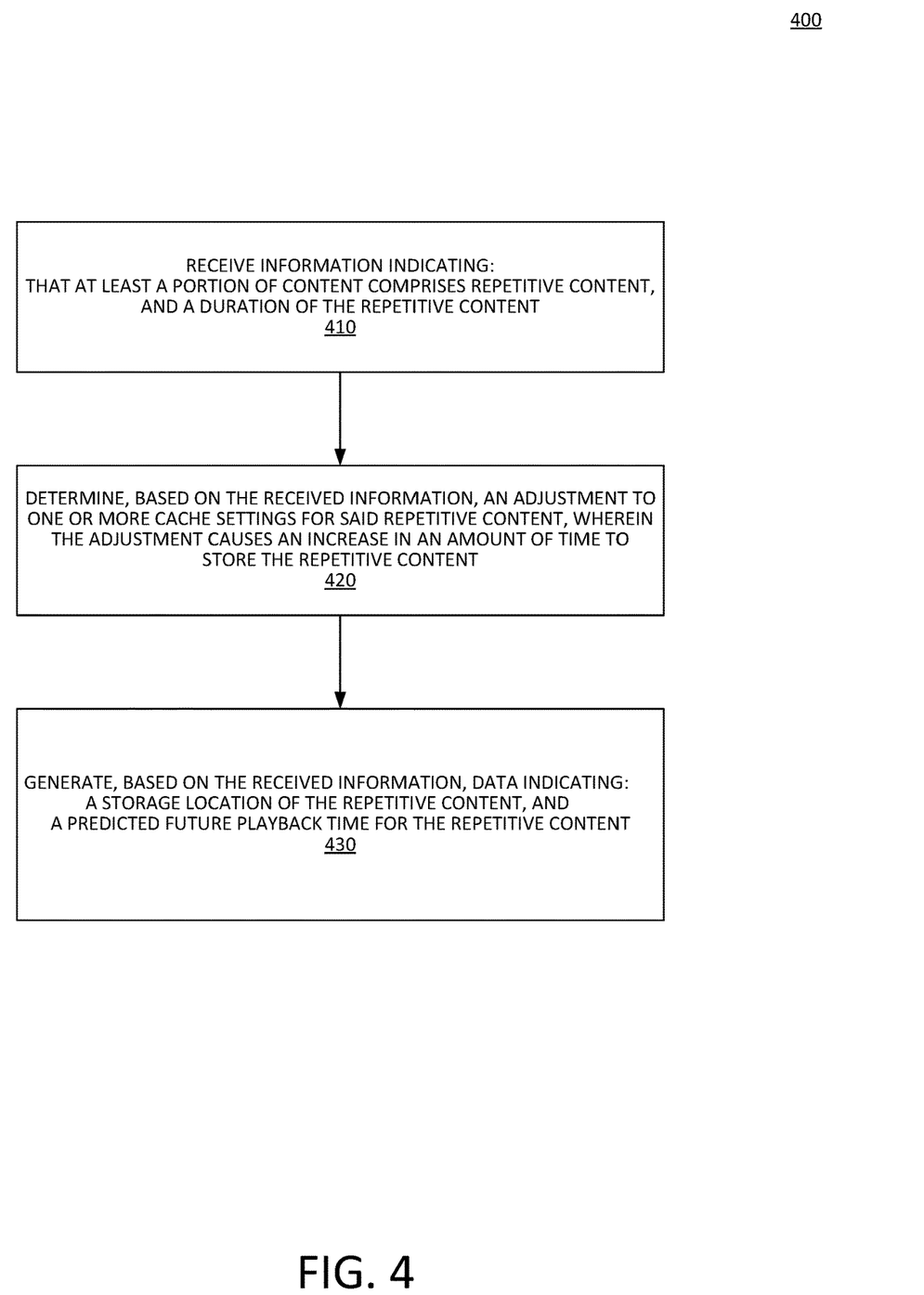
FIG. 4 shows an example method.

FIG. 4 shows an example method 400. The method 400 of FIG. 4 may be performed by any of the devices described herein such as the packager depicted in FIGS. 1-3. While each step in the method 400 of FIG. 4 is shown and described separately, multiple steps may be executed in a different order than what is shown, in parallel with each other, or concurrently with each other. At step 410, the system, e.g., the packager or another device, may receive information. The information may indicate that at least a portion of content comprises repetitive content and a duration of the repetitive content. The content may comprise one or more streams outputted by a transcoder. The information may indicate an optimal increased cache value per stream. For example, the an optimal increased cache value may comprise an increased cache value over time based upon the content provider switching to new content and returning to repetitive content at a future playback time. The information may be received from a transcoder or a stream tracer computing device.

The repetitive content may be determined based on performance of one or more machine learning algorithms. The one or more machine learning algorithms may determine a probability of repetition based on comparison of incoming content to internally stored content. The probability of repetition may be determined based on one or more of: pixel by pixel analysis of the one or more streams of content, sample areas analysis of the one or more streams of content, or predictive analysis of the one or more streams of content.

The one or more machine learning algorithms may generate a successful prediction of the subsequent frames, and the system may determine the duration of the repetitive content using the source timeline. The system may determine information such as statistics indicating how much time has passed since a last transmission of the repetitive content, how often the content provider switches to new content and returns to the repetitive content, and other such parameters. This information may be used to determine how long to increase the cache duration of the repetitive content in anticipation of future playback of the content. For example, the optimal increased cache value may be based upon these statistics. The information may indicate when the return to repetitive content is likely to occur and may be used to increase the cache value so that the repetitive content is available in the cache for the predicted future use.

At step 420, the system may determine, based on the received information, an adjustment to one or more cache settings for said repetitive content. The adjustment may comprise an increase in an amount of time to store the repetitive content so that it is available in the cache for the predicted future use.

At step 430, the system may generate, based on the received information, data. The data may indicate a storage location of the repetitive content and a predicted future playback time for the repetitive content. The data may indicate a cycle of one or more segments of content to repeat during the cycle. The data may be associated with a file, such as a manifest. The manifest may cause a computing device to retrieve the repetitive content from the cache, and repeat the repetitive content based on the cycle during playback. The manifest may indicate one or more locations associated with the cache storing the repetitive content. The cycle may indicate one or more segments of content to repeat during the cycle.

The system may receive second information indicating a switch from the repetitive content to new content. The system may send, to a transcoder and based on the second information, a request for one or more streams of the new content.

Figure 5:
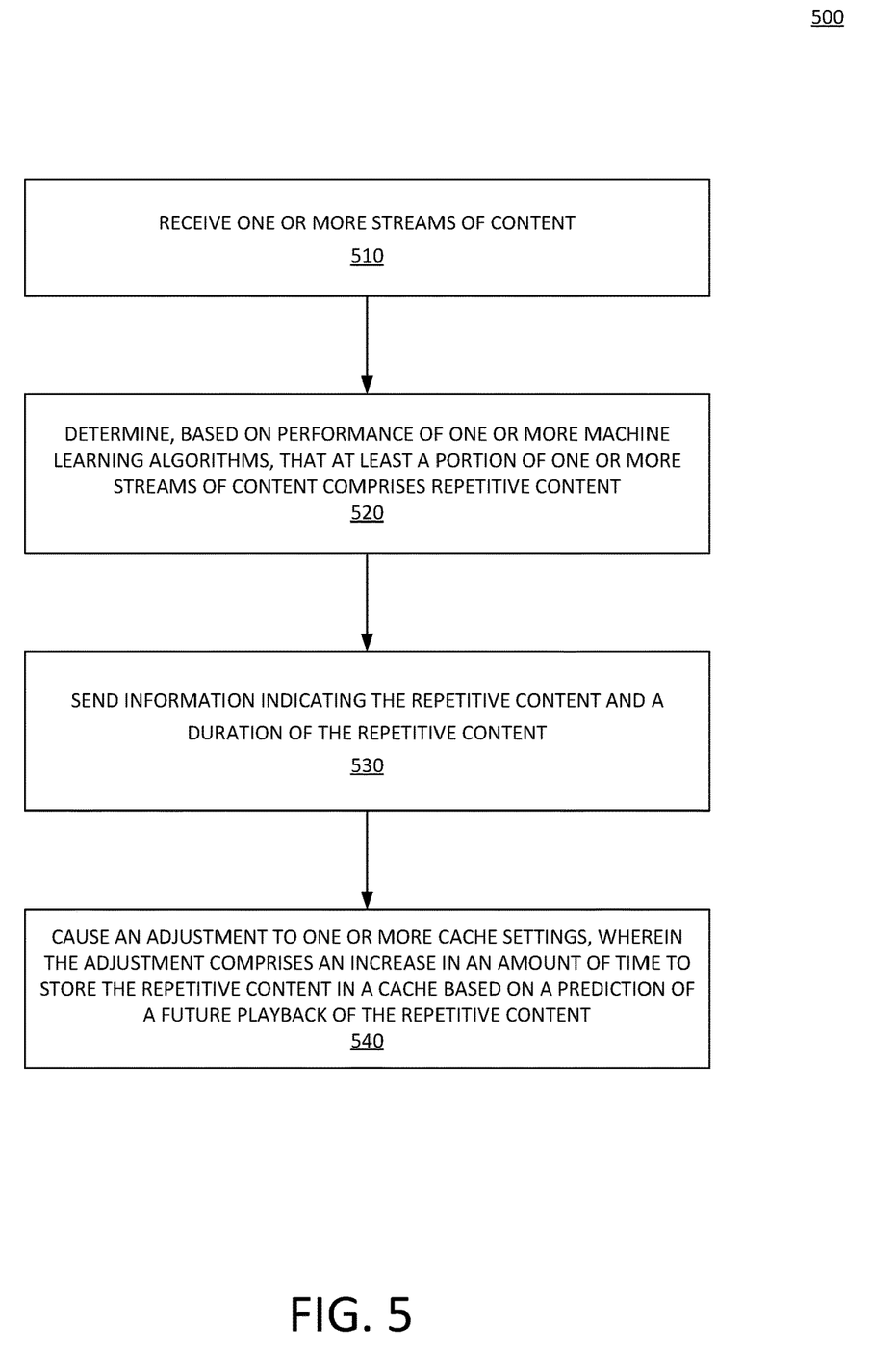
FIG. 5 shows an example method.

FIG. 5 shows an example method 500. The method 500 of FIG. 5 may be performed by any of the devices described herein such as the stream tracer computing device depicted in FIG. 2. While each step in the method 500 of FIG. 5 is shown and described separately, multiple steps may be executed in a different order than what is shown, in parallel with each other, or concurrently with each other. At step 510, the system may receive one or more streams of content. The one or more streams of content may have been outputted by a transcoder or received directly from a content provider.

At step 520, the system may determine, based on performance of one or more machine learning algorithms, that at least a portion of one or more streams of content comprises repetitive content. The one or more machine learning algorithms may determine a probability of repetition based on comparison of incoming content to internally stored content. The probability of repetition may be determined based on one or more of: pixel by pixel analysis of the one or more streams of content, sample areas analysis of the one or more streams of content, or predictive analysis of the one or more streams of content.

The one or more machine learning algorithms may generate a successful prediction of the subsequent frames, and the system may determine the duration of the repetitive content using the source timeline. The system may determine information such as statistics indicating how much time has passed since a last transmission of the repetitive content, how often the content provider switches to new content and returns to the repetitive content, and other such parameters.

At step 530, the system may send information indicating the repetitive content and a duration of the repetitive content. This information may be used to determine how long to increase the cache duration of the repetitive content in anticipation of future playback of the content. For example, an optimal increased cache value may be based upon these statistics. The optimal increased cache value may be for each stream of content of the one or more streams of content. The information may indicate when the return to repetitive content is likely to occur and may be used to increase the cache value so that the repetitive content is available in the cache for the predicted future use.

At step 540, the system may cause an adjustment to one or more cache settings. The adjustment may comprise an increase in an amount of time to store the repetitive content in a cache. The adjustment may be based on the prediction of a future playback of the repetitive content.

The system may generate, based on the sent information, data associated with a file, such as a manifest. The manifest indicating a cycle of the repetitive content. The manifest may cause a computing device to retrieve the repetitive content from the cache, and repeat the repetitive content based on the cycle during playback. The manifest may indicate one or more locations associated with the cache storing the repetitive content. The cycle may indicate one or more segments of content to repeat during the cycle.

The system may send, to the packager, second information indicating a switch from the repetitive content to new content. The packager may send, to the transcoder and based on the second information, a request for one or more streams of the new content.

Figure 6:
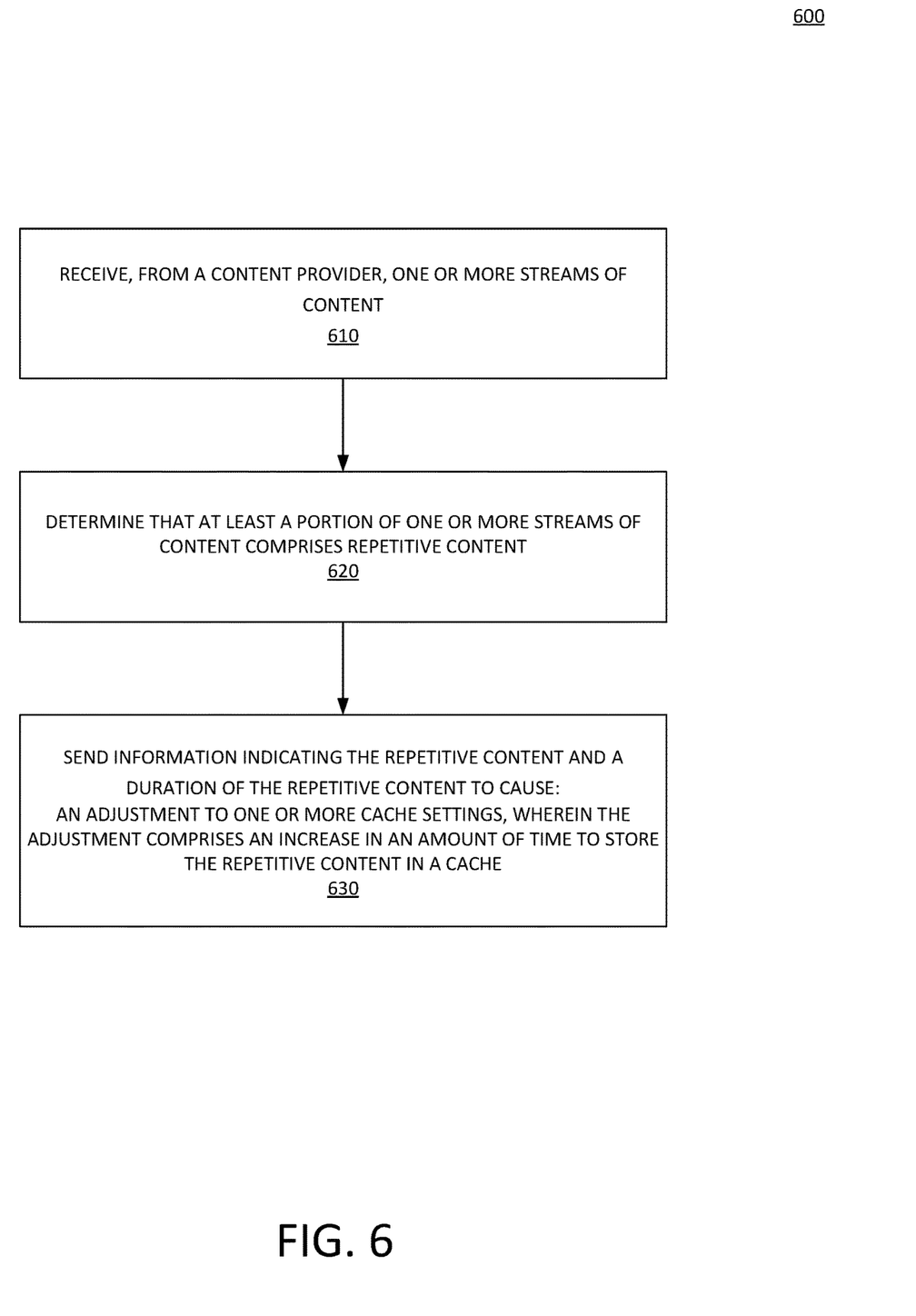
FIG. 6 shows an example method.

FIG. 6 shows an example method 600. The method 600 of FIG. 6 may be performed by any of the devices described herein such as the transcoder depicted in FIG. 3. While each step in the method 600 of FIG. 6 is shown and described separately, multiple steps may be executed in a different order than what is shown, in parallel with each other, or concurrently with each other. At step 610, the system may receive, from a content provider, one or more streams of content.

At step 620, the system may determine, based on performance of one or more machine learning algorithms, that at least a portion of one or more streams of content comprises repetitive content. The one or more machine learning algorithms may determine a probability of repetition based on comparison of incoming content to internally stored content. The probability of repetition may be determined based on one or more of: pixel by pixel analysis of the one or more streams of content, sample areas analysis of the one or more streams of content, or predictive analysis of the one or more streams of content.

The one or more machine learning algorithms may generate a successful prediction of the subsequent frames, and the system may determine the duration of the repetitive content using the source timeline. The system may determine information such as statistics indicating how much time has passed since a last transmission of the repetitive content, how often the content provider switches to new content and returns to the repetitive content, and other such parameters.

At step 630, the system may send information indicating the repetitive content and a duration of the repetitive content. This information may be used to determine how long to increase the cache duration of the repetitive content in anticipation of future playback of the content. For example, an optimal increased cache value may be based upon these statistics. The optimal increased cache value may be for each stream of content of the one or more streams of content. The information may indicate when the return to repetitive content is likely to occur and may be used to increase the cache value so that the repetitive content is available in the cache for the predicted future use.

The information may cause an adjustment to one or more cache settings. The adjustment may comprise an increase in an amount of time to store the repetitive content in a cache. The adjustment may be based on the prediction of a future playback of the repetitive content.

The system may generate, based on the sent information, data associated with a file, such as a manifest. The manifest indicating a cycle of the repetitive content. The manifest may cause a manifest a computing device to retrieve the repetitive content from the cache, and repeat the repetitive content based on the cycle during playback. The manifest may indicate one or more locations associated with the cache storing the repetitive content. The cycle may indicate one or more segments of content to repeat during the cycle.

The system may send second information indicating a switch from the repetitive content to new content. The system may send, to a transcoder and based on the second information, a request for one or more streams of the new content.

Figure 7:
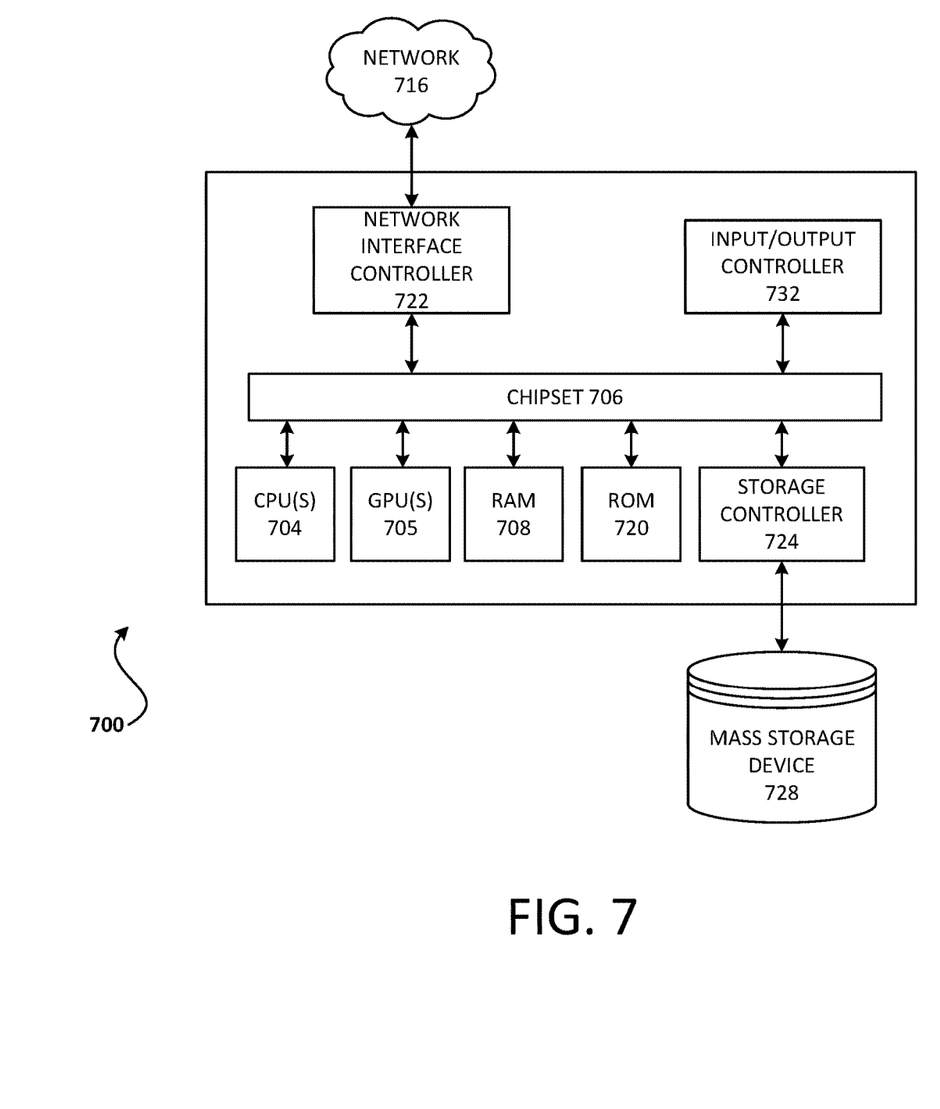
FIG. 7 depicts an example computing device.

FIG. 7 depicts a computing device 700 that may be used in various aspects, such as the servers, encoders, computing device, and other devices depicted in FIG. 1. With regard to the example architectures of FIG. 1, the devices may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 4-6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 4-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
receiving content comprising a plurality of video frames;
determining, based on video analysis performed by one or more machine learning algorithms, information indicating:
that at least a portion of the plurality of video frames comprises repetitive content,
a prediction of one or more subsequent video frames indicating a duration of the repetitive content, and
a prediction of a future playback time for the repetitive content;
determining, based on the information, an adjustment to one or more cache settings for said repetitive content, wherein the adjustment causes an increase in an amount of time to store the repetitive content; and
sending, to a computing device, an indication of a storage location of the repetitive content and of the future playback time for the repetitive content.

2. The method of claim 1, wherein the prediction of the future playback time for the repetitive content is based on a cycle of one or more segments of content that repeat during the cycle.

3. The method of claim 1, wherein the storage location indicates one or more caches storing the repetitive content.

4. The method of claim 1, wherein the information indicates an optimal value for the adjustment for each transcoder output stream associated with the content.

5. The method of claim 1, wherein the one or more machine learning algorithms determined a probability of repetition based on a comparison of the plurality of video frames to internally stored video frames.

6. The method of claim 5, wherein the probability of repetition was determined based on one or more of: pixel by pixel analysis of the content, sample areas analysis of the content, or predictive analysis of the content.

7. The method of claim 1, wherein the information determined by at least one of a transcoder or a stream tracer computing device.

8. The method of claim 1, further comprising:
receiving second information indicating a switch from the repetitive content to new content;
sending, to a transcoder and based on the second information, a request for the new content.

9. The method of claim 1, wherein the receiving comprises receiving, by a packager.

10. A method comprising:
receiving one or more streams of content;
based on video analysis performed by one or more machine learning algorithms, determining:
that at least one or more video frames of the one or more streams of content comprises repetitive content,
a prediction of one or more subsequent video frames indicating a duration of the repetitive content, and
a prediction of a future playback time for the repetitive content; and
causing an adjustment to one or more cache settings, wherein the adjustment comprises an increase in an amount of time to store the repetitive content based on the prediction of the future playback time for the repetitive content.

11. The method of claim 10, wherein the prediction of the future playback time for the repetitive content is based on a cycle of one or more segments of content that repeat during the cycle.

12. The method of claim 10, wherein causing the adjustment comprises:
sending information indicating one or more locations associated with the cache storing the repetitive content.

13. The method of claim 12, wherein the information indicates an optimal value for the adjustment for each stream of content of the one or more streams of content.

14. The method of claim 10, wherein the one or more machine learning algorithms determine a probability of repetition based on comparison of the one or more streams of content to internally stored content.

15. The method of claim 14, wherein the probability of repetition was determined based on one or more of: pixel by pixel analysis of the one or more streams of content, sample areas analysis of the one or more streams of content, or predictive analysis of the one or more streams of content.

16. The method of claim 10, further comprising:
sending second information indicating a switch from the repetitive content to new content;
sending, based on the second information, a request for one or more streams of the new content.

17. A method comprising:
receiving, from a content provider, one or more streams of content;
based on video analysis performed by one or more machine learning algorithms, determining:
that at least one or more video frames of the one or more streams of content comprises repetitive content,
a prediction of one or more subsequent video frames indicating a duration of the repetitive content, and
a prediction of a future playback time for the repetitive content; and
sending information indicating the repetitive content and the duration of the repetitive content to cause:
an adjustment to one or more cache settings, wherein the adjustment comprises an increase in an amount of time to store the repetitive content based on the prediction of the future playback time for the repetitive content.

18. The method of claim 17, wherein the prediction of the future playback time for the repetitive content is based on a cycle of one or more segments of content that repeat during the cycle.

19. The method of claim 17, wherein the information indicates an optimal value for the adjustment for each stream of content of the one or more streams of content.

20. The method of claim 17, wherein the one or more machine learning algorithms determined a probability of repetition based on comparison of the one or more streams of content to internally stored content, wherein the probability of repetition was determined based on one or more of: pixel by pixel analysis of the one or more streams of content, sample areas analysis of the one or more streams of content, or predictive analysis of the one or more streams of content.

* * * * *